G. H. Thatcher.
Tire Tightener.
N° 4,888. Patented Dec. 12, 1846.

UNITED STATES PATENT OFFICE.

GEO. H. THATCHER, OF BALLSTON, NEW YORK.

SETTING TIRES UPON WHEELS.

Specification of Letters Patent No. 4,888, dated December 12, 1846.

*To all whom it may concern:*

Be it known that I, GEORGE H. THATCHER, of the town of Ballston, county of Saratoga, and State of New York, have invented a new and useful Machine for Setting Tires on Wheels of Wagons and other Vehicles, which I call a "Tire-Setter;" and I do hereby declare that the following is a full, clear, and exact description of the construction and operation of the same, reference being had to the annexed drawings, making part of this specification, in which—

Figure 1:
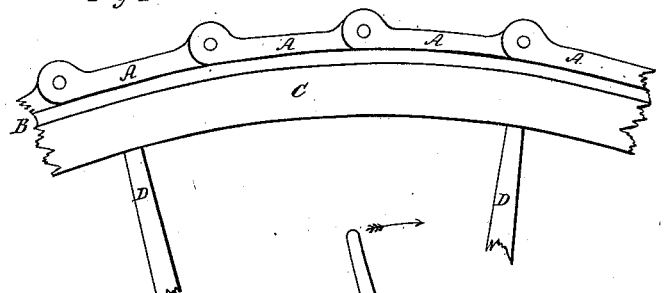
Figure 3:
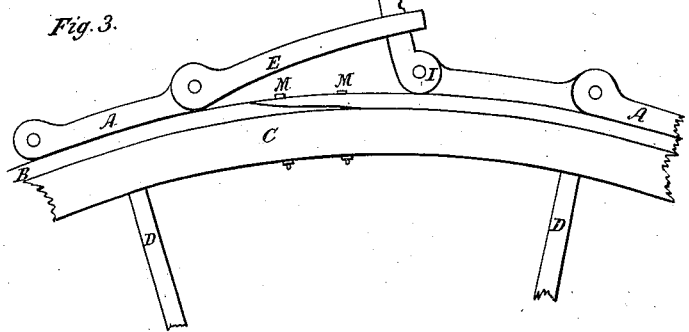
Figure 2:
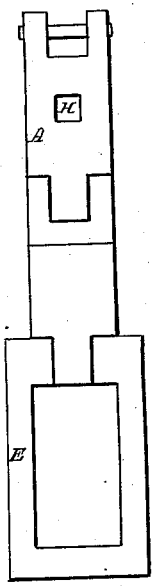
Figure 5:
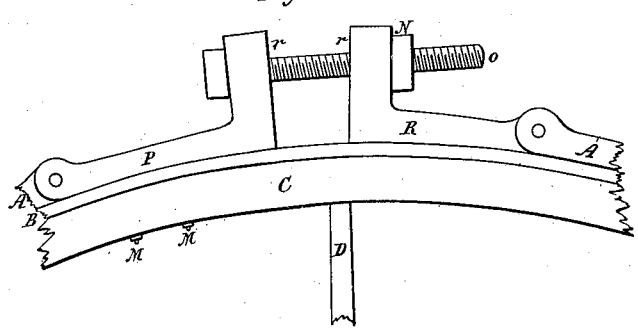
Figure 4:
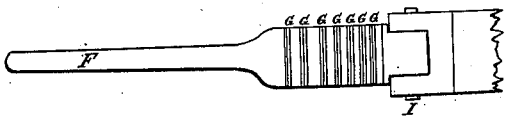
Figure 6:
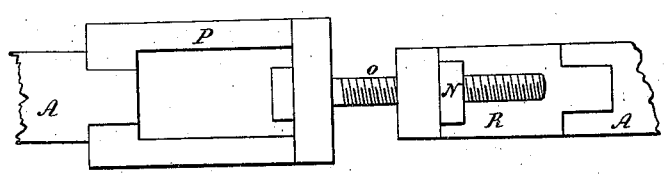

Figure 1, is a side view of a portion of a wheel and a portion of the tire-setter. Fig. 3, is a like view of another portion of the wheel and another portion of the tire-setter showing the ends of the same, fitted together as when used. Figs. 2, and 4, are perpendicular views of the two ends of the tire-setter, not fitted together. Fig. 5, is a side view of a portion of the wheel and the ends of the tire-setter connected together by a different arrangement (a substitute for that seen in Fig. 3). Fig. 6 is a perpendicular view of that part of the tire-setter seen in Fig. 5.

The wheel is supposed in all these figures where it is seen to stand vertically. The same letters are used to represent the same parts in all of the figures.

The parts A A A, &c., are joints, made of iron, connected together by pivots, shaped to the curve of the wheel and forming when fastened together as in Fig. 1, a flexible iron band in length nearly equal to the circumference of the wheel, including the tire, and of the same breadth as the wheel.

B, represents the tire, C the felly and D, D the spokes of a wheel.

F is a lever, turning vertically on the pivot I, and having grooves in it G, G, &c., into any of which the catch E may be fastened when the tiresetter is used. E also turns vertically on a pivot.

M, M, are bolts passing through the ends of the tire and through the felly and secured on the inner side of the felly by nuts.

R and P represent a substitute for the lever and catch, each being fastened at one end of the flexible band, and being brought toward each other by the nut N working on the screw O which passes through both R and P.

H is an opening which is made in some or all of the joints A for the purpose mentioned hereafter.

It will thus be seen that I have a strong band of iron (or other metal) made flexible by means of a number of joints, so as to fit accurately the circumference of a wheel outside of the tire and that the ends of this band (which do not meet when it is put around the wheel outside of the tire) can be brought closer together by means of the lever and catch or the nut and screw; thus compressing the tire and the wheel. The tire is to be made somewhat longer than the circumference of the wheel so that the ends of it shall overlap for two inches or thereabout; and the parts which thus overlap are to be beveled or cut down so that the tire shall be no thicker at that part than elsewhere. One or more holes are made through these ends of the tire and through the felly underneath in the direction of the radius of the wheel and when the tire is in its place bolts are put through these holes and secured by nuts on the inner side of the felly, or otherwise secured.

In using this tire-setter the tire is made of such a length as to fit the wheel tightly when overlapped the proper distance and the necessary holes are made to receive the bolts M M. The tire is then put on either cold or slightly heated as may be preferred, and the flexible band composed of the parts A A, &c., with the lever and catch, F and E, at its ends, is put on outside of the tire as seen in Figs. 1 and 3, and the lever and catch are adjusted as seen in Fig. 3. A movement of the lever then in the direction of the dotted line or arrow bringing the ends of the tire setter together compresses the fellies and spokes of the wheel and brings the ends of the tire up to their proper places while the lever is still held so as to compress the wheel the bolts M M are put into the holes made for them and secured on the inner side of the felly before removing the tire-setter, and if it is needed, rivets or spikes may be driven through the tire and into the fellies at other places through the holes made in the joints A A, &c., as at H, Fig. 2.

The manner of using the machine when the nut and screw are substituted for the lever and catch, is the same as above described except that the ends of the tire-setter are brought together and the wheel is compressed and the tire brought to its place by turning the nut around instead of moving the lever.

It should be noticed that the holes in P and R at r through which the bolt o passes are made rather large to permit the bolt to move as the parts P and R approach each other.

Figure 7:
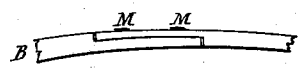

The ends of the tire may be put together as seen in Fig. 7 which is a side view of a portion of the tire where the ends meet being ship lapped or halved.

The advantages of this mode of setting tire are numerous. It is a saving of labor, of time and expense. Ordinary country blacksmiths are under the necessity of building a circular fire for heating their tire generally outside their shop which is inconvenient—requires more time—added to which is the expense of fuel, and requires moreover, to do it properly, two persons to put the tire on. Whereas by this mode the circular fire is entirely dispensed with not only by ordinary blacksmiths but by others—less time is required to accomplish the object—and it may be done as easily by a single person. Again in the present mode the wheel is in danger of being spoiled or injured by burning the fellies too much, in which case when it is much charred when it comes to be used the charred particles are jarred out and the joints of the fellies loosened and so materially injured. It is in danger of being injured also by too great or too little contraction of the iron thus springing the spokes or making the wheel untrue. As it is exceedingly difficult even for the most skilful workmen, owing to the variety of the iron and wood to calculate the exact degree of contraction in any given case needed. But by this method the necessary compression may be gaged exactly, and so all those difficulties avoided. Again, the sudden cooling of the tire necessary in the ordinary mode often weakens the tire itself by causing it to crack or making it brittle. These advantages are peculiarly applicable to light wheels and to the setting of tire the second time. Another object gained by this arrangement is the gaging of the compression of the tire according to the temperature of the weather moist and muddy weather causes the wood to expand and the iron to contract, and hot weather the reverse. But in an hour's time or even less a blacksmith by shortening or lengthening the ends of the tire and making a new hole for the bolt or rivet may either compress or loosen it as the wheel may require.

What I claim as my invention and desire to secure by Letters Patent is—

The before described mode or manner of setting tire around fellies of wheels by the application of a jointed band, in the manner which I have described for the purposes of tightening the fellies and spokes and setting the tire by means of the compression caused by drawing the ends of such flexible bands toward each other by the lever and catch, or by the nut and screw, above described, or other means substantially the same such as by a wedge or key and overlapping the ends and securing the tire by bolts held by nuts or riveted or by other means substantially the same.

GEORGE H. THATCHER.

Witnesses:
WM. P. ELLIOT,
ALBERT E. H. JOHNSON.